(12) United States Patent
Yun

(10) Patent No.: US 11,493,406 B2
(45) Date of Patent: Nov. 8, 2022

(54) MOTOR NOISE DETECTING DEVICE AND DETECTING METHOD USING AE SENSOR

(71) Applicant: KOREA MANUFACTURE PROCESS CO., LTD., Siheung-si (KR)

(72) Inventor: Keun Su Yun, Ansan-si (KR)

(73) Assignee: KOREA MANUFACTURE PROCESS CO., LTD., Siheung-si (KR)

(*) Notice: Subject to any disclaimer, the term of this patent is extended or adjusted under 35 U.S.C. 154(b) by 119 days.

(21) Appl. No.: 17/138,154

(22) Filed: Dec. 30, 2020

(65) Prior Publication Data

US 2022/0196607 A1    Jun. 23, 2022

Related U.S. Application Data

(63) Continuation of application No. PCT/KR2020/018901, filed on Dec. 22, 2020.

(30) Foreign Application Priority Data

Dec. 22, 2020    (KR) .................. 10-2020-0180970

(51) Int. Cl.
   *G01M 15/12*    (2006.01)
   *G01N 29/14*    (2006.01)
   (Continued)

(52) U.S. Cl.
   CPC .......... *G01M 15/12* (2013.01); *G01N 29/14* (2013.01); *G01N 29/4418* (2013.01);
   (Continued)

(58) Field of Classification Search
   CPC .. G01M 15/12; G01M 13/028; G01M 13/045; G01M 15/11; G01N 29/14;
   (Continued)

(56) References Cited

U.S. PATENT DOCUMENTS

| 10,385,853 | B2 * | 8/2019 | Araki | ................. G01H 1/003 |
| 2017/0097323 | A1 * | 4/2017 | D'Souza | ............. G01N 29/14 |

(Continued)

FOREIGN PATENT DOCUMENTS

| CA | 2683824 A1 * | 10/2008 | ............. G01S 11/14 |
| CA | 2710902 A1 * | 1/2011 | ............. F03D 1/003 |

(Continued)

OTHER PUBLICATIONS

International Search Report issued in PCT/KR2020/018901; dated Sep. 17, 2021.

*Primary Examiner* — Lisa M Caputo
*Assistant Examiner* — Rose M Miller
(74) *Attorney, Agent, or Firm* — Studebaker & Brackett PC

(57) ABSTRACT

A motor noise detecting device according to an embodiment of the present disclosure includes a signal sensing part for sensing an acoustic signal generated from an object to be tested, a data acquisition part for receiving the acoustic signal sensed by the signal sensing part and converting it into an acoustic digital signal, and a data analysis part for receiving and analyzing the acoustic digital signal to perform a detection on whether the object to be tested is abnormal. In addition, the signal sensing part includes an AE (Acoustic Emission) sensor for sensing an elastic wave included in the acoustic signal, and the data analysis part generates result data of analyzing the acoustic digital signal, analyzes the generated result data through a pre-learned model, and detects whether the object to be tested is abnormal.

18 Claims, 7 Drawing Sheets

(51) Int. Cl.
*G01N 29/44* (2006.01)
*G01N 29/46* (2006.01)
*H02K 11/20* (2016.01)
*G01M 13/045* (2019.01)
*G01M 15/11* (2006.01)
*G01M 13/028* (2019.01)

(52) U.S. Cl.
CPC ..... *G01N 29/4463* (2013.01); *G01N 29/4481* (2013.01); *G01N 29/46* (2013.01); *H02K 11/20* (2016.01); *G01M 13/028* (2013.01); *G01M 13/045* (2013.01); *G01M 15/11* (2013.01)

(58) Field of Classification Search
CPC ........... G01N 29/4418; G01N 29/4481; G01N 29/46; G01N 2291/0289; G01N 29/4463; H02K 11/20
USPC .......................................................... 700/30
See application file for complete search history.

(56) References Cited

U.S. PATENT DOCUMENTS

| | | | |
|---|---|---|---|
| 2020/0210825 A1* | 7/2020 | Szurley | G06N 3/0454 |
| 2022/0034289 A1* | 2/2022 | Huckaby | G01L 23/221 |

FOREIGN PATENT DOCUMENTS

| | | | | |
|---|---|---|---|---|
| CN | 105243421 A | * | 1/2016 | |
| CN | 111238837 A | | 6/2020 | |
| CN | 111626153 A | * | 9/2020 | |
| CN | 111898095 A | * | 11/2020 | ............ G01S 11/14 |
| DE | 102011054938 B4 | * | 3/2019 | ............ G01D 1/06 |
| EP | 0529786 A2 | * | 3/1993 | ............ F03D 1/003 |
| JP | 2006-090904 A | | 4/2006 | |
| KR | 10-1645605 B1 | | 8/2016 | |
| KR | 10-1723523 B1 | | 4/2017 | |
| KR | 101745805 B1 | * | 6/2017 | ............ G01D 1/06 |
| KR | 10-2040492 B1 | | 11/2019 | |
| KR | 10-2154413 B1 | | 9/2020 | |

* cited by examiner

[FIG. 1]
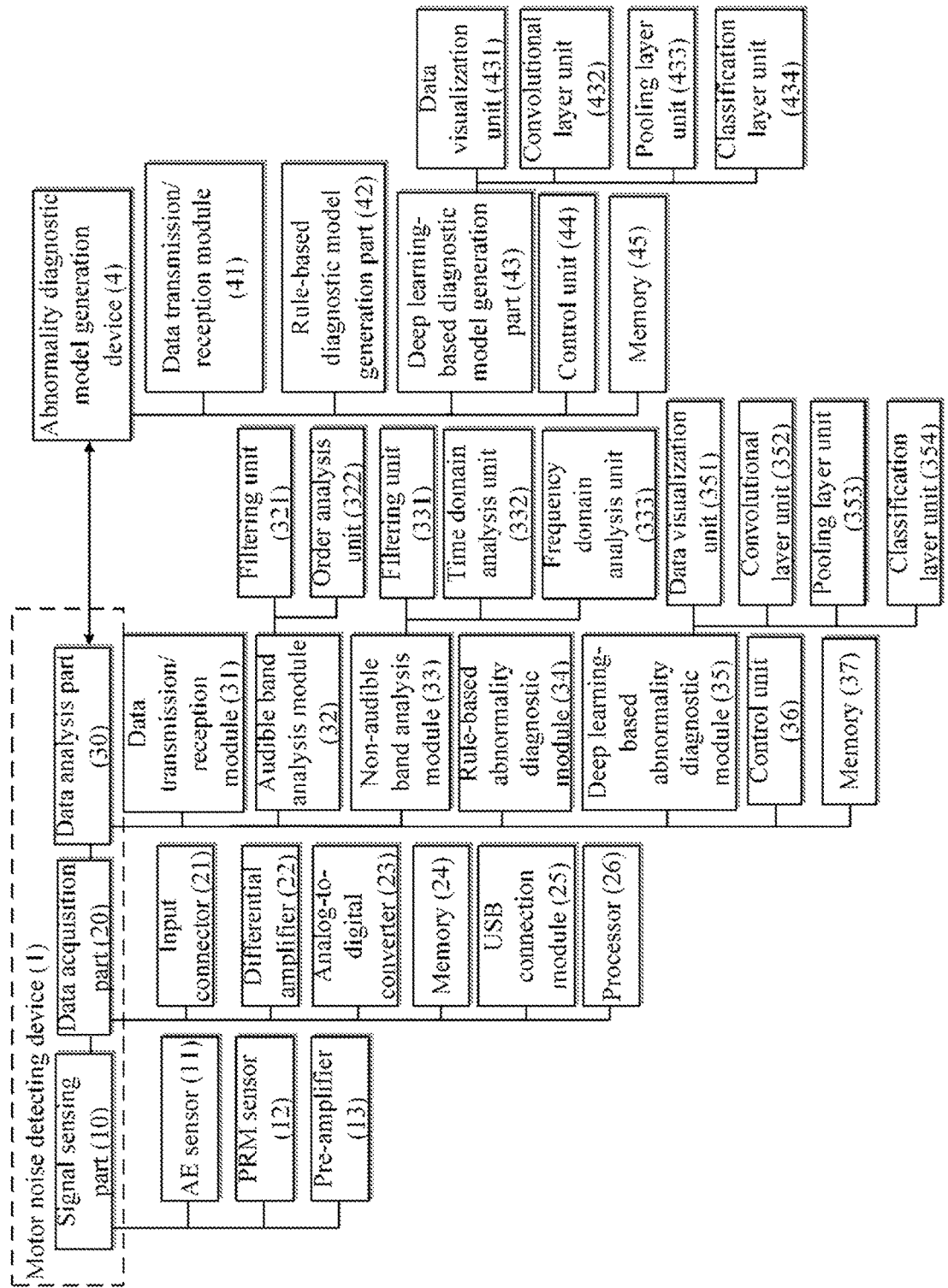

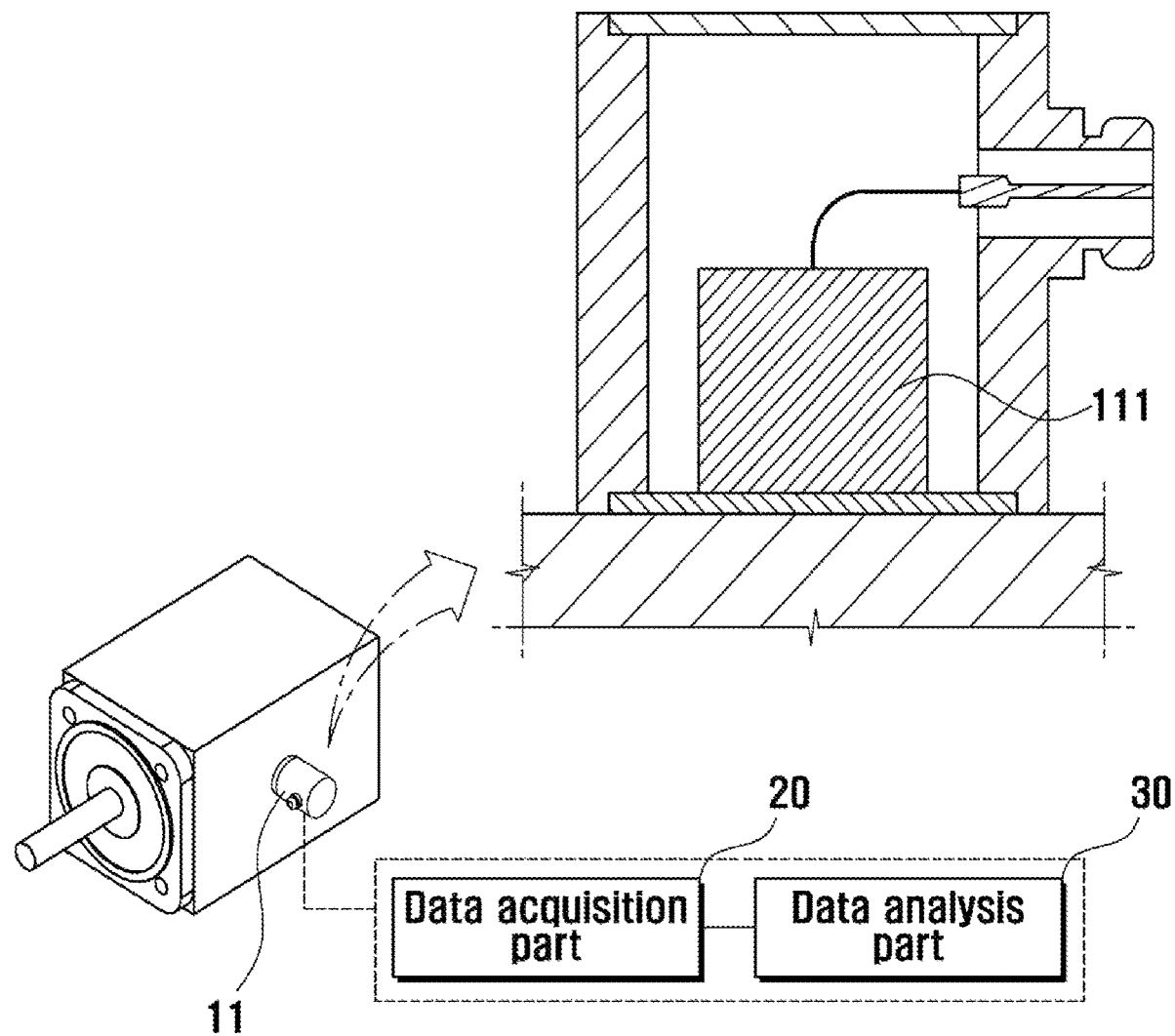

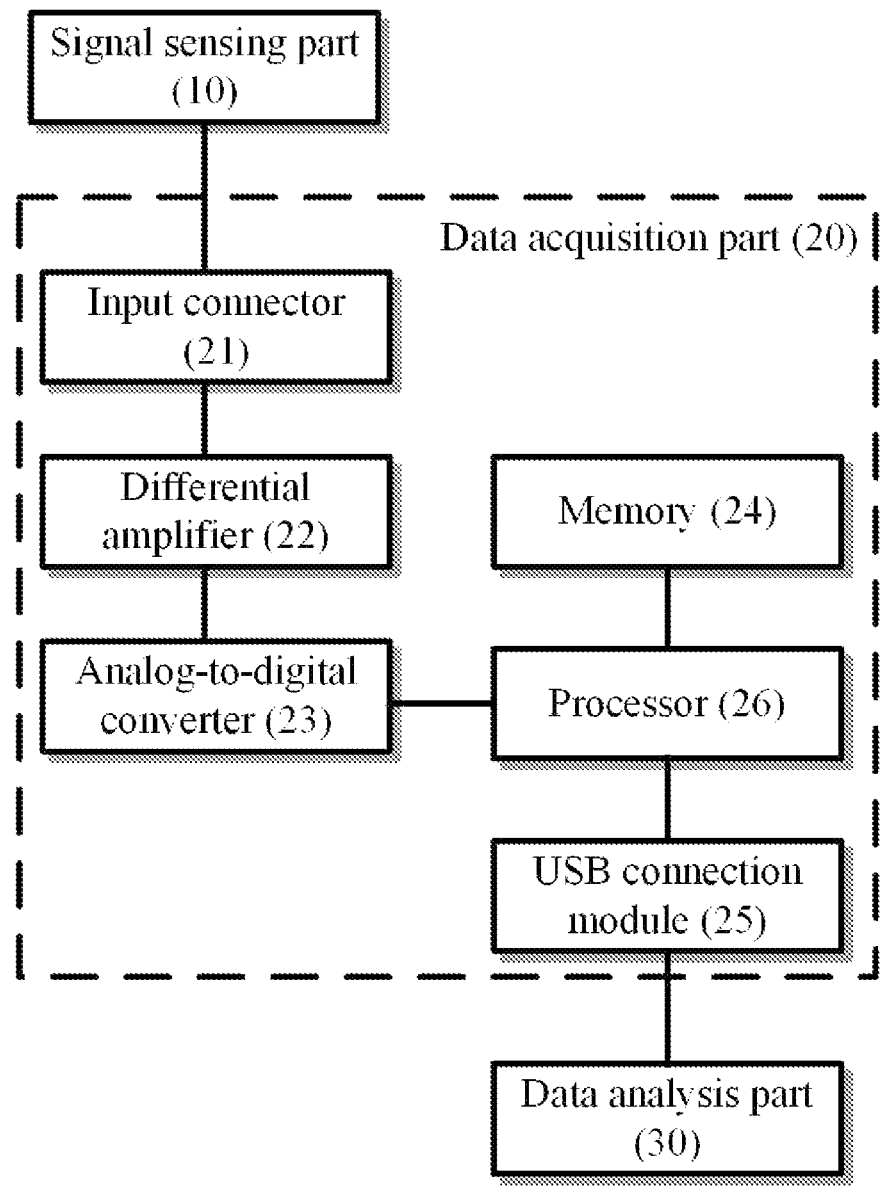
[FIG. 3]

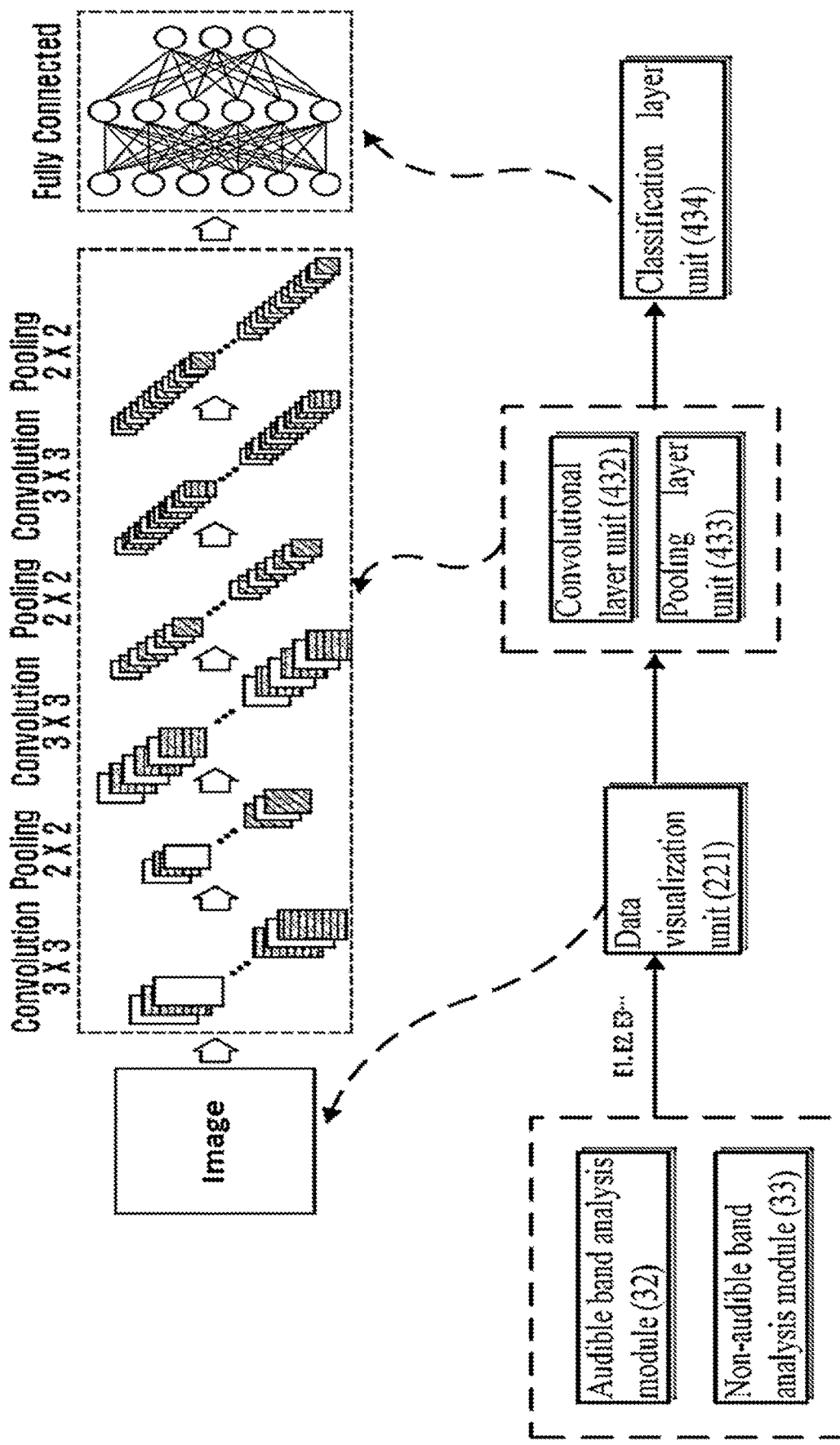
[FIG. 5]

[FIG. 6]
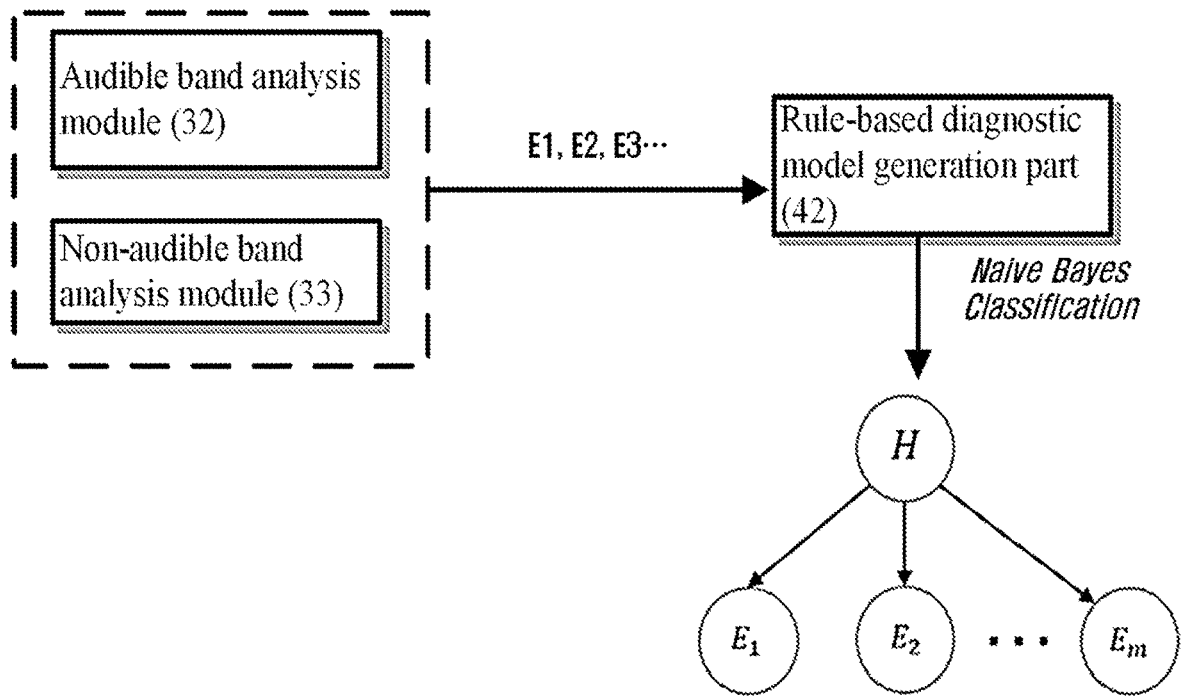
[FIG. 7]
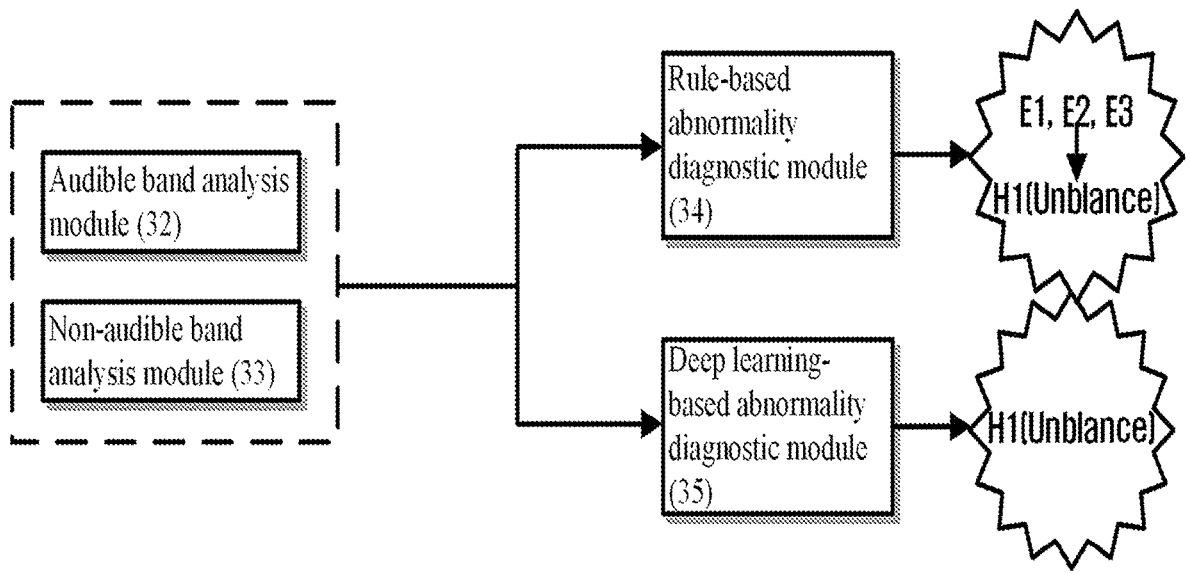

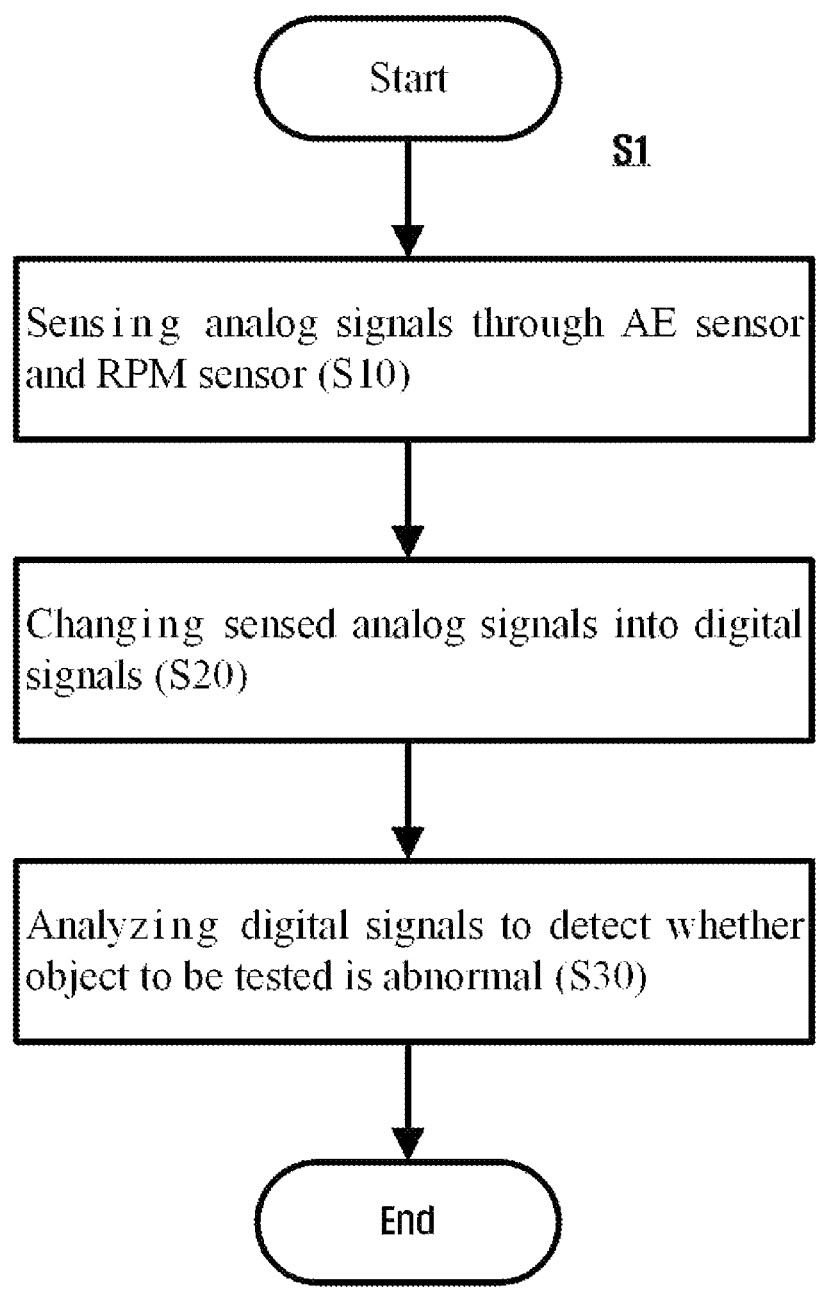
[FIG. 8]

MOTOR NOISE DETECTING DEVICE AND DETECTING METHOD USING AE SENSOR

CROSS-REFERENCE TO RELATED APPLICATION

The present application is a continuation of International Patent Application No. PCT/KR2020/018901, filed on Dec. 22, 2020, which is based upon and claims the benefit of priority to Korean Patent Application No. 10-2020-0180970 filed on Dec. 22, 2020. The disclosures of the above-listed applications are hereby incorporated by reference herein in their entirety.

BACKGROUND

1. Technical Field

The present disclosure relates to a motor noise detecting device and a detecting method using an AE sensor capable of measuring the noise of a vehicle motor using an AE sensor.

2. Description of Related Art

In general, Acoustic Emission Testing (AET) is one of the non-destructive detecting methods to detect through a detector that the energy accompanied during a process when an object to be tested is deformed, cracked, or destroyed, is emitted as an elastic wave, so as to analyze whether any defects such as damage or cracks have occurred in an object to be tested, the size of defects, the location, and the degree of progression. The test device used when performing such an acoustic emission testing generally includes a detector which is attached to and fixed to an object to be tested to detect an elastic wave signal from an object to be tested, a pre-amplifier which primarily amplifies an elastic wave signal detected by the detector, a band-pass filter which passes only a signal of a specific bandwidth among the elastic wave signals amplified through the pre-amplifier, a main amplifier which secondarily amplifies an elastic wave signal that has passed through the band-pass filter, a threshold identification unit which selects only a signal having a threshold value or higher than a set threshold value among the elastic wave signals secondarily amplified by the main amplifier, a signal analysis device which analyzes the elastic wave signal selected by the threshold identification unit to determine a defect of an object to be tested, and a device which records the result analyzed by the signal analysis device in an output device such as a display or a printer or a storage device such as a computer.

However, in the conventional acoustic emission test device, while the friction sound and vibration sound generated by the movement of parts connected to an object to be tested, noise due to the external environment, the vibration sound caused by driving a motor (hereinafter referred to as "noise signal") are detected together through an acoustic emission sensor (AE sensor), an elastic wave signal generated by vibration or low-frequency acoustic signal and a pure elastic wave signal generated by destruction, plastic deformation, warping, and corrosion are combined to show a composite signal including noise (vibration or acoustic signal). It is not easy to distinguish the noise signal from the composite signal, and as a result, there are many differences in the detecting results depending on the skill of a worker analyzing an elastic wave signal, and it takes a lot of time to obtain an accurate detection result.

Accordingly, in a test device for acoustic emission testing, it has been required to develop an acoustic emission test device that can more accurately extract an elastic wave signal and shorten the time required to analyze the elastic wave signal after extracting it.

RELATED ART DOCUMENT

Patent Document

Korean Patent No. 10-1723523, Mar. 30, 2017

SUMMARY OF THE INVENTION

According to an aspect of the present disclosure, there is provided a motor noise detecting device and a detecting method using an AE sensor capable of effectively measuring the abnormality of a vehicle motor using a diagnostic model learned based on the analyzed data, and analyzing the acoustic signal sensed using the AE sensor.

In addition, according to an aspect of the present disclosure, there is provided a motor noise detecting device and a detecting method using an AE sensor capable of improving the accuracy of determining the abnormality of a vehicle motor by using a rule-based diagnostic model and a deep learning-based diagnostic model, and also providing the cause of abnormality.

The aspects of the present disclosure are not limited to the above-mentioned aspects, and other aspects, which are not mentioned, will be clearly understood by those skilled in the art from the following description.

A motor noise detecting device using an AE sensor according to an embodiment of the present disclosure includes a signal sensing part for sensing an acoustic signal generated from an object to be tested, a data acquisition part for receiving the acoustic signal sensed by the signal sensing part and converting it into an acoustic digital signal, and a data analysis part for receiving and analyzing the acoustic digital signal to perform a detection on whether the object to be tested is abnormal.

In addition, the signal sensing part includes an AE (Acoustic Emission) sensor for sensing an elastic wave included in the acoustic signal.

In addition, the data analysis part generates result data of analyzing the acoustic digital signal, analyzes the generated result data through a pre-learned model, and detects whether the object to be tested is abnormal.

In addition, the data analysis part further includes an audible band analysis module for generating result data by analyzing a signal included in a preset audible band among the acoustic digital signals, and a non-audible band analysis module for generating result data by analyzing a signal included in a preset non-audible band among the acoustic digital signals.

In addition, the signal sensing part further includes an RPM sensor configured to sense an RPM signal, and the data acquisition part receives the RPM signal and converts it into an RPM digital signal.

In addition, the audible band analysis module analyzes a signal included in a preset audible band among the acoustic digital signals and the RPM digital signal through order analysis to generate result data.

In addition, the non-audible band analysis module includes a filtering unit for filtering a signal included in a preset non-audible band among the acoustic digital signals, a time domain analysis unit for generating result data including at least one of an integral amount, a width, a maximum height, and a peak counter by extracting an envelope based on time and amplitude of a filtered signal, and a frequency domain analysis unit for generating result data including at least one of amount of electricity and energy for each frequency band by analyzing the filtered signal through a fast Fourier transform based on a frequency and an amplitude.

In addition, the model includes a rule-based abnormality diagnostic model and a deep learning-based abnormality diagnostic model.

In addition, the data analysis part includes a rule-based abnormality diagnostic module for analyzing the result data using the rule-based abnormality diagnostic model, matching an abnormality type of the object to be tested and a cause characteristic included in the result data, and outputting the matched result, and a deep learning-based abnormality diagnostic module for analyzing the result data using the deep learning-based abnormality diagnostic model and outputting the abnormality type of the object to be tested.

In addition, the rule-based abnormality diagnostic model is learned using the result data, and is generated by learning a probability corresponding to the abnormality type of the object to be tested when each of the preset cause characteristics is included in the result data.

In addition, the rule-based abnormality diagnostic model is generated based on Bayes' theorem.

In addition, the deep learning-based abnormality diagnostic model is generated by learning visualization data converted from the result data into an image form using a Convolution Neutral Network (CNN).

In addition, the deep learning-based abnormality diagnostic module converts the result data into image-type visualization data, analyzes the converted visualization data through the deep learning-based abnormality diagnostic model, and outputs an abnormality type of the object to be tested.

In addition, a motor noise detecting method according to an embodiment of the present disclosure according to a method performed by the device includes: sensing an acoustic signal generated from an object to be tested using an AE (Acoustic Emission) sensor provided in the device; converting the sensed acoustic signal into an acoustic digital signal; generating result data of analyzing the acoustic digital signal; and analyzing the generated result data through a pre-learned model to detect whether the object to be tested is abnormal.

In addition, the generating of the result data includes: generating first result data by analyzing a signal included in a preset audible band among the acoustic digital signals; and generating second result data by analyzing a signal included in a preset non-audible band among the acoustic digital signals.

In addition, the motor noise detecting method further includes: sensing an RPM signal of the object to be tested using an RPM sensor provided in the device; and converting the RPM signal into an RPM digital signal.

In addition, the generating of the first result data includes: filtering a signal included in a preset audible band among the acoustic digital signals; and generating the first result data by analyzing the filtered signal and the RPM digital signal through order analysis.

In addition, the generating of the second result data includes: filtering a signal included in a preset non-audible band among the acoustic digital signals; generating second result data including at least one of an integral amount, a width, a maximum height, and a peak counter by extracting an envelope based on time and amplitude of the filtered signal; and generating second result data including at least one of amount of electricity and energy for each frequency band by analyzing the filtered signal through a fast Fourier transform based on a frequency and an amplitude.

In addition, the model includes a rule-based abnormality diagnostic model and a deep learning-based abnormality diagnostic model.

In addition, the detection includes: analyzing the result data using the rule-based abnormality diagnostic model, matching an abnormality type of the object to be tested and a cause characteristic included in the result data, and outputting the matched result; and analyzing the result data using the deep learning-based abnormality diagnostic model, and outputting the abnormality type of the object to be tested.

In addition, the rule-based abnormality diagnostic model is learned using the result data, and is generated by learning a probability corresponding to the abnormality type of the object to be tested when each of the preset cause characteristics is included in the result data.

In addition, the rule-based abnormality diagnostic model is generated based on Bayes' theorem.

In addition, the deep learning-based abnormality diagnostic model is generated by learning visualization data converted from the result data into an image form using a Convolution Neutral Network (CNN).

In addition, the outputting of the abnormality type of the object to be tested includes: converting the result data into image-type visualization data; and analyzing the converted visualization data through the deep learning-based abnormality diagnostic model, and outputting the abnormality type of the object to be tested.

Other specific details of the present disclosure are included in the detailed description and drawings.

According to an embodiment of the present disclosure, by detecting the noise of a vehicle motor using an AE sensor, it is possible to more accurately determine a defect for an object to be tested and prevent the production of defective products.

According to an embodiment of the present disclosure, since the signal sensed through the AE sensor is less affected by external noise, it is possible to determine whether the object to be tested is defective in the field without moving to an anechoic chamber. Through this, the man hour required for manufacturing an object to be tested can be reduced, thereby reducing production cost.

According to an embodiment of the present disclosure, a signal sensed through an AE sensor is analyzed and the analyzed result is analyzed through a pre-learned abnormality diagnostic model to detect whether an object to be tested is defective, and thus the detection time can be shortened.

According to an embodiment of the present disclosure, since an object to be tested is detected for defects by using the rule-based diagnostic model and the deep learning-based diagnostic model, the accuracy of defect judgment can be improved and the cause of defect can be provided together.

The effects of the present disclosure are not limited to the above-mentioned effects, and other effects, which are not mentioned, will be clearly understood by those skilled in the art from the following description.

BRIEF DESCRIPTION OF THE DRAWINGS

FIG. 1 is a block diagram illustrating a configuration of a motor noise detecting device using an AE sensor according to an embodiment of the present disclosure.

FIG. 2 is a conceptual diagram illustrating the AE sensor of FIG. 1.

FIG. 3 is a block diagram illustrating a configuration of the data acquisition part of FIG. 1.

FIG. 5 is a conceptual diagram illustrating a detecting process through a rule-based diagnostic model.

FIG. 6 is a conceptual diagram illustrating a process of generating a deep learning-based diagnostic model.

FIG. 7 is a conceptual diagram illustrating test results derived through a rule-based diagnostic model and a deep learning-based diagnostic model.

FIG. 8 is a flowchart illustrating a process of a motor noise detecting method using an AE sensor according to an embodiment of the present disclosure.

DETAILED DESCRIPTION

Figure 4I:
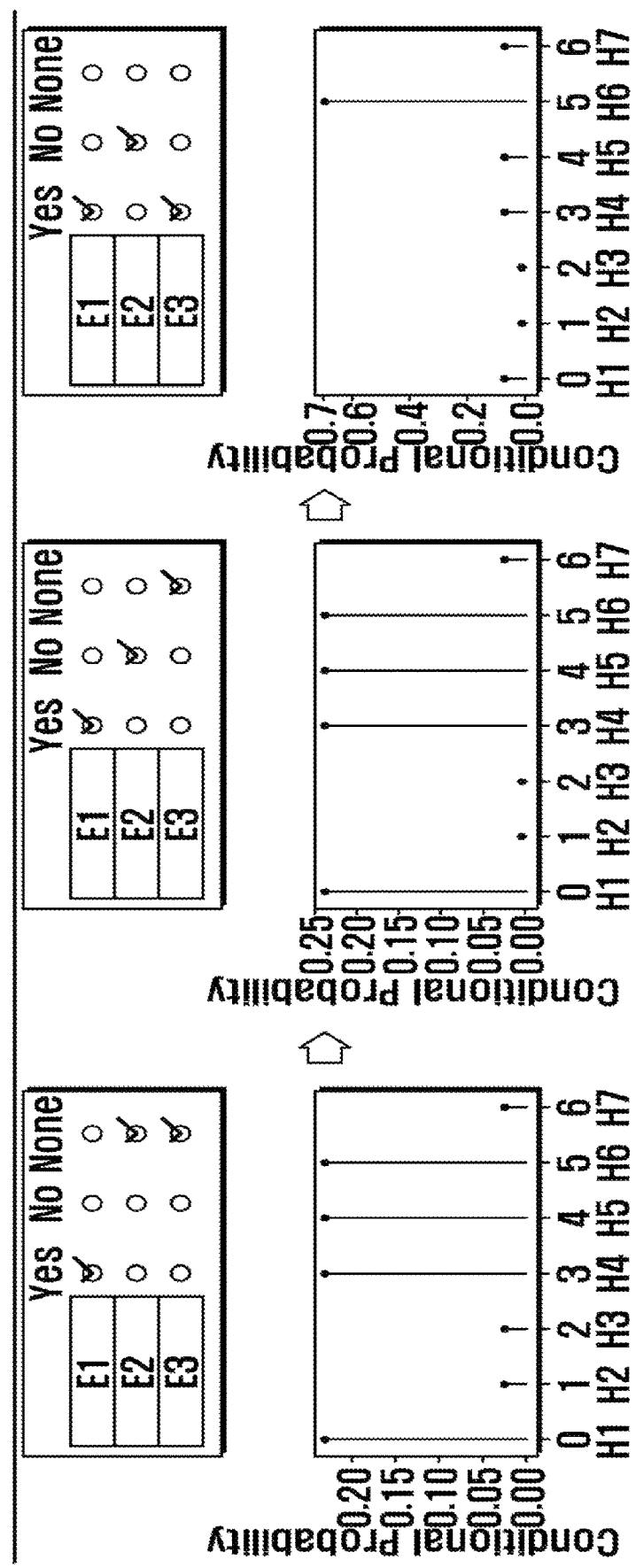
FIG. 4 is a conceptual diagram illustrating a process of generating a rule-based diagnostic model.

Advantages and features of the present disclosure and methods for achieving them will be apparent from the embodiments described below in detail in conjunction with the accompanying drawings. However, the present disclosure is not limited to the embodiments disclosed below, but may be implemented in various different forms. The embodiments are provided so that this disclosure will be thorough and complete and will fully convey the scope of the present disclosure to those skilled in the technical field to which the present disclosure pertains. It is to be noted that the scope of the present disclosure is defined only by the claims.

The terminology used herein is for the purpose of describing embodiments and is not intended to limit the present disclosure. As used herein, the singular may be intended to include the plural forms as well, unless the context clearly indicates otherwise. The terms "comprises" and/or "comprising" used herein do not preclude the presence or addition of one or more other components, in addition to the mentioned components. Like reference numerals designate like components throughout the specification. As used herein, the term "and/or" includes each and all combinations of one or more of the mentioned components. It will be understood that, although the terms "first", "second", etc., may be used herein to describe various components, these components should not be limited by these terms. These terms are only used to distinguish one component from another component. Accordingly, a first component mentioned below could be termed a second component without departing from the technical ideas of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, embodiments of the present disclosure will be described in detail with reference to the accompanying drawings.

1. Description of a Motor Noise Detecting Device 1 Using an AE Sensor According to an Embodiment of the Present Disclosure As illustrated in FIG. 1, the motor noise detecting device 1 using the AE sensor according to an embodiment of the present disclosure includes a signal sensing part 10, a data acquisition part 20, and a data analysis part 30.

The signal sensing part 10 is configured to be detachable from a motor, which is an object to be tested, and may sense RPM information and elastic waves generated from a motor in contact with the motor.

The data acquisition part 20 converts the analog type elastic wave and RPM information received from the signal sensing part 10 into a digital signal.

The converted digital signal is transmitted to the data analysis part 30, and the data analysis part 30 determines whether the motor is abnormal by analyzing the received digital signal.

(1) Description of the Signal Sensing Part 10

The signal detection unit 10 includes an AE sensor (Acoustic Emission Sensor) 11, an RPM sensor 12, and a pre-amplifier 13.

The AE sensor 11 is configured to be detachable from a motor, and is configured to sense an elastic wave generated from the motor in contact with the motor.

The AE sensor 11 is configured to sense a frequency in the 2 [Hz]~1.2 [MHz] band. That is, the AE sensor 11 is configured to sense not only a frequency of the audible band but also a frequency of the non-audible band.

With reference to FIG. 2, the AE sensor 11 is illustrated by way of example.

The AE sensor 11 includes a piezoelectric transducer 111 capable of detecting even a weak signal in the unit of μV (micro volt), and converts an elastic wave into an electric signal through a piezoelectric transducer 111. In one embodiment, the piezoelectric transducer 111 may be configured with piezo ceramic.

In one embodiment, the motor, which is an object to be tested, has a mover and a stator, and the AE sensor 11 may measure an elastic wave of the motor in a state of being in contact with the stator or a motor hosing with which the stator is combined.

In an embodiment, in order to minimize the influence of external noise, elastic waves may be measured while the AE sensor 11 and the motor are accommodated in a chamber having a predetermined space therein, but is not limited thereto.

Conventionally, a motor was detected using a microphone by measuring vibration generated by rotation of the motor and transmitted into the air. However, since the vibration is transmitted through the air, the speed of the sound wave is slowed down even if the frequency is maintained.

On the other hand, since the motor noise detecting device 1 according to an embodiment of the present disclosure senses the vibration transmitted through the motor in a state in which the AE sensor 11 is in direct contact with the motor, the vibration in the non-audible region can be sensed, and the vibration can be sensed without change.

Since the elastic wave proceeds using the motor as a medium, it is hardly affected by ambient noise. Accordingly, the noise test can be performed in the field without moving to an anechoic room, so that the man hour of manufacturing a motor can be reduced. As a result, the cost required for manufacturing a motor can be reduced.

In addition, even with one AE sensor 11, it is possible to sense all the elastic waves generated in the entire area of a motor. However, the present disclosure is not limited thereto, and according to an embodiment, the AE sensor 11 may be configured in a plural number.

The signal sensed by the AE sensor 11 is processed by the data acquisition part 20 and transmitted to the data analysis part 30.

Referring back to FIG. 1, the signal sensing part 10 includes an RPM sensor 12. The RPM sensor 12 senses a revolution per minute (RPM) signal of a mover of the motor.

In addition, the signal sensing part 10 includes a pre-amplifier 13, and the pre-amplifier 13 amplifies the signal sensed by the AE sensor 11. The amplified signal is transmitted to the data acquisition part 20. In addition, the RPM signal sensed by the RPM sensor 12 is also transmitted to the data acquisition part 20.

The motor, which is an object to be tested, may be a vehicle motor, but is not limited thereto, and may include a motor included in various automation facilities. The vehicle motor may be in a state in which dimension and appearance inspection, no-load characteristic inspection, insulation inspection and load inspection have been completed after assembling the individual parts of the motor, but is not limited thereto.

Here, the signal sensing part 10 and the data acquisition part 20 may be synchronized in real time using a wireless communication network to transmit and receive data. The wireless communication network may support various long-distance communication methods, and various widely known wireless communication or mobile communication methods may be applied. Alternatively, the signal sensing part 10 and the data acquisition part 20 may transmit and receive data through a wired communication method.

(2) Description of the Data Acquisition Part (20)

Referring to FIGS. 1 and 3, a data acquisition part 20 includes an input connector 21, a differential amplifier 22, an analog-to-digital converter 23, a memory 24, a USB connection module 25 and a processor 26.

The analog-type elastic wave signal and RPM signal received by the signal sensing part 10 are converted into digital signals by the data acquisition part 20 and transmitted to the data analysis part 30.

The data acquisition part 20 is communicatively connected with the signal sensing part 10 through the input connector 21 and receives a signal sensed by the signal sensing part 10 through the input connector 21.

In one embodiment, the input connector 21 may be configured with a compatible and inexpensive RJ 45 connector and a Shielded Twisted Pair (STP) cable.

The signal received through the input connector 21 is transmitted to the differential amplifier 22.

The differential amplifier 22 increases the signal to noise ratio (SNR) by reducing noise of the received signal. A gain 1 or 2 may be applied to the circuit of the differential amplifier 22. In one embodiment, THS4551 may be used as the differential amplifier 22.

The signal from which noise has been removed from the differential amplifier 22 is transmitted to the analog-to-digital converter 23, and the analog-to-digital converter 23 converts the analog type signal transmitted from the differential amplifier 22 into a digital signal.

In one embodiment, a postprocess such as filtering for a digital signal of the analog-to-digital converter 23 may be omitted, and the omitted postprocess may be performed by the data analysis part 30. Through this, the internal filter of the analog-to-digital converter 23 can be reduced and the signal processing logic can be simplified. As a result, the production cost of the data acquisition part 20 can be reduced.

In one embodiment, the analog-to-digital converter 23 may be implemented as an IC (ADS850) having a performance of 14 bit, 10 Msps, and parallel I/F.

The memory 24 may store data transmitted and received through the input connector 21 and the USB connection module 25 and data supporting various functions of the data acquisition part 20.

The memory 24 may store a plurality of application programs (application programs or applications) driven by the data acquisition part 20, data for the operation of the data acquisition part 20, and commands.

In one embodiment, the memory 24 may be a 64 k×18 FIFO memory (SN74V293).

The USB connection module 25 is configured to transmit the converted digital signal to the data analysis part 30 through USB.

The data analysis part 30 may be implemented with software installed in various OS environments (Windows, Mac OS, and Linux), and the USB connection module 25 is configured to transmit the converted digital signal to various OS environments (Windows, Mac OS, and Linux) through USB.

In one embodiment, the USB connection module 25 may be implemented by a USB-FIFO (FT600) chip.

The processor 26 controls each component of the data acquisition part 20 to function. That is, each function of the input connector 21, the differential amplifier 22, the analog-to-digital converter 23, the memory 24, and the USB connection module 25 is controlled. For example, the processor 26 controls the digital signal converted by the analog-to-digital converter 23 to be transmitted to the data analysis part 30 through the USB connection module 25.

In one embodiment, the logic of the processor 26 may be implemented in a Field Programmable Gate Array (FPGA) as a VHSIC Hardware Description Language (VHDL).

In addition, in an embodiment not illustrated, the data acquisition part 20 may receive an analog signal from the signal sensing part 10 through a wireless communication module and transmit a digital signal to the data analysis part 30. The wireless communication network may support various long-distance communication methods, for example, various communication methods such as Wireless LAN (WLAN), DLNA (Digital Living Network Alliance), Wibro (Wireless Broadband), Wimax (World Interoperability for Microwave Access), GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), IEEE 802.16, Long Term Evolution (LTE), LTEA (Long Term Evolution-Advanced), Wireless Mobile Broadband Service (WMBS), BLE (Bluetooth Low Energy), Zigbee, RF (Radio Frequency), and LoRa (Long Range) may be applied, but are not limited thereto. Widely known various wireless or mobile communication methods may be applied.

(3) Description of the Data Analysis Part 30

Referring back to FIG. 1, the data analysis part 30 includes a data transmission/reception module 31, an audible band analysis module 32, a non-audible band analysis module 33, a rule-based abnormality diagnostic module 34, and a deep learning-based abnormality diagnostic module 35.

The data analysis part 30 may receive data from the data acquisition part 20 through the data transmission/reception module 31 and transmit the data to an external server.

The data transmission/reception module 31 may transmit and receive data through a USB connector, and is configured to transmit and receive data through a wireless communication network. The wireless communication network has been described above together with the data acquisition part 20, and a description of the wireless communication network will be replaced therewith.

The digital type elastic wave signal received by the data acquisition part 20 is filtered into an audible band and a non-audible band by the audible band analysis module 32 and the non-audible band analysis module 33 for analysis.

In order to separate and analyze an audible band from the received elastic wave signal, the audible band analysis module 32 includes a filtering unit 321 and an order analysis unit 322.

The filtering unit 321 is configured to separate a signal of an audible band from the digital signal received by the data analysis part 30, and the order analysis unit 322 analyzes the signal of the separated audible band.

In one embodiment, the filtering unit 321 may be configured to filter a signal less than 100 [kHz].

The order analysis unit 322 analyzes the RPM signal and the elastic wave signal received by the data analysis part 30 through order analysis to derive the frequency of occurrence of the elastic wave signal generated per unit rotation. The derived result data is transmitted to the rule-based abnormality diagnostic module 34 and the deep learning-based abnormality diagnostic module 35.

In order to separate and analyze a non-audible band from the elastic wave signal received from the data acquisition part 20, the non-audible band analysis module 33 includes a filtering unit 331, a time domain analysis unit 332, and a frequency domain analysis unit (333).

The filtering unit 331 is configured to separate a signal of a non-audible band from the digital signal received by the data analysis part 30. In one embodiment, the filtering unit 331 may be configured to separate signals in a band of 100 [kHz] to 1.2 [MHz].

The time domain analysis unit 332 envelope extracts the filtered signal based on a time-amplitude and detects an integral amount, a width, a maximum height, and a peak counter.

The frequency domain analysis unit 333 analyzes the filtered signal through a fast Fourier transform based on a frequency-amplitude and detects amount of electricity and energy for each frequency band.

The result data detected by the time domain analysis unit 332 and the frequency domain analysis unit 333 are transmitted to the rule-based abnormality diagnostic module 34 and the deep learning-based abnormality diagnostic module 35.

The rule-based abnormality diagnostic module 34 and the deep learning-based abnormality diagnostic module 35 analyze the result data received from the audible band analysis module 32 and the non-audible band analysis module 33 through the pre-learned abnormality diagnostic model, and diagnose an abnormality of the motor.

The abnormality diagnostic model used in the rule-based abnormality diagnostic module 34 and the deep learning-based abnormality diagnostic module 35 is generated by an abnormality diagnostic model generation device 4 capable of communicating with a motor noise detecting device 1.

The abnormality diagnostic model generation device 4 includes a data transmission/reception module 41 for transmitting and receiving data with the motor noise detecting device 1. In one embodiment, the data transmission/reception module 41 is configured to transmit and receive data through a wireless communication network. The wireless communication network has been described above together with the data acquisition part 20, and a description of the wireless communication network will be replaced therewith.

The abnormality diagnostic model generation device 4 includes a rule-based diagnostic model generation part 42 for generating a rule-based abnormality diagnostic model and a Deep learning-based diagnostic model generation part 43 for generating a deep learning-based diagnostic model.

The rule-based diagnostic model generation part 42 matches the result data of the audible band analysis module 32 and the non-audible band analysis module 33 transmitted to the abnormality diagnostic model generation device 4 with an abnormality type of the motor to generate learning data and generate a rule-based abnormality diagnostic model through learning through the generated learning data. In one embodiment, the abnormality type may include a normal state and a plurality of preset abnormal states.

Bayes' theorem may be used to generate a rule-based abnormality diagnostic model. Bayes' theorem can be understood with reference to Equation 1.

$$P(H/E) = \frac{P(E/H) \times P(H)}{P(E)} \quad \text{[Equation 1]}$$

In Equation 1, P(H) represents a prior probability or boundary probability of H, and the prior means that no information on event E is yet considered.

In Equation 1, P(E/H) represents the conditional probability of E when H is given, and is called a posterior probability because it is determined by a specific value of H. P(E) may be defined as a normalization parameter.

Referring to FIG. 4, the abnormality diagnostic model generated by the rule-based diagnostic model generation part 42 is conceptually illustrated.

The generated abnormality diagnostic model may calculate the probability of occurrence of an abnormal cause (H1, H2, H3 . . . ) of a motor when specific values (E1, E2, E3 . . . ) included in the result data included in the audible band analysis module 32 or the non-audible band analysis module 33 are included. In one embodiment, the specific values (E1, E2, E3 . . . ) may represent a cause characteristic indicating that the motor is in an abnormal state. For example, when E1 is measured, the coupling of bolts of a specific part is weakly fastened, and the probability of occurrence of vibration imbalance (H1) may be calculated as E1 occurs.

Referring to FIG. 5, a process of diagnosing an abnormality of a motor through the abnormality diagnostic model generated by the rule-based diagnostic model generation part 42 is illustrated as an example.

First, when E1 data is included in the result data included in the audible band analysis module 32 or the non-audible band analysis module 33, the abnormality diagnostic model outputs that H1, H4, H5, and H6 may be involved as an abnormality type.

Moreover, when E1 data is included in the result data, E2 data is not included, and when E3 data is included, the abnormality diagnostic model may output H6, which is the most probable abnormality type. In other words, the abnormality diagnostic model outputs that it corresponds to the abnormality type H6 because E1 and E3 are included in the result data.

As such, the abnormality diagnostic model may match and output specific values (cause characteristics) included in the input result data and the abnormality type.

The rule-based diagnostic model generation part 42 may generate an abnormality diagnostic model for each of the audible band and the non-audible band. In one embodiment, the rule-based diagnostic model generation part 42 may generate an abnormality diagnostic model for each motor type by using result data collected for each motor type.

The Deep learning-based diagnostic model generation part 43 generates an abnormality diagnostic model through learning using the result data of the audible band analysis module 32 and the non-audible band analysis module 33 transmitted to the abnormality diagnostic model generation device 4. In one embodiment, a Convolution Neural Network (CNN) algorithm is used for learning.

Referring to FIGS. 1 and 6, the Deep learning-based diagnostic model generation part 43 includes a data visualization unit 431, a convolutional layer unit 432, a pooling layer unit 433, and a classification layer unit 434.

The data visualization unit 431 changes the transmitted result data of the audible band analysis module 32 and the non-audible band analysis module 33 into visualization data to generate learning data.

In one embodiment, the result data may be changed into image-type visualization data through a Short Time Furrier Transform (STFT), and a wavelet transform.

In addition, the data visualization unit 431 generates learning data by matching the visualization data with the abnormality type of a motor. In one embodiment, the abnormality type may include a normal state and a plurality of preset abnormal states.

The convolutional layer unit 432 and the pooling layer unit 433 extract features from the learning data.

Specifically, the convolutional layer unit 432 extracts and outputs a feature map from the learning data through a convolution operation, and the pooling layer unit 433 performs pooling to select a maximum value, an average value, and a minimum value in the output feature map.

In the illustrated embodiment, the convolutional layer unit 432 and the pooling layer unit 433 repeatedly perform a convolution operation and pooling.

The classification layer unit 434 forms a fully connected layer by using the data output through the convolutional layer unit 432 and the pooling layer unit 433, and through this, the learning data is classified according to normality and abnormality type of a motor. When classification is completed, the Deep learning-based diagnostic model generation part 21 corrects a weighting through backpropagation.

As described above, the result data of the audible band analysis module 32 and the non-audible band analysis module 33 are changed into visualization data to generate training data, and the training data is learned through a deep convolution neural network (DCNN) method to generate an abnormality diagnostic model.

The Deep learning-based diagnostic model generation part 43 may generate an abnormality diagnostic model for each of the audible band and the non-audible band. In one embodiment, the Deep learning-based diagnostic model generation part 43 may generate an abnormality diagnostic model for each motor type using result data collected for each motor type.

The abnormality diagnostic model generated by the abnormality diagnostic model generation device 4 is transmitted to the data analysis part 30, and the rule-based abnormality diagnostic module 34 and the deep learning-based abnormality diagnostic module 35 of the data analysis part 30 use the received abnormality diagnostic model to diagnose whether a motor is abnormal.

The rule-based abnormality diagnostic module 35 analyzes the result data of the audible band analysis module 32 and the non-audible band analysis module 33 through the abnormality diagnostic model generated by the rule-based diagnostic model generation part 42, and the deep learning-based abnormality diagnostic module 35 analyzes the result data of the audible band analysis module 32 and the non-audible band analysis module 33 through the abnormality diagnostic model generated by the Deep learning-based diagnostic model generation part 43.

The deep learning-based abnormality diagnostic module 35 includes a data visualization unit 351 that converts the result data of the audible band analysis module 32 and the non-audible band analysis module 33 into image-type visualization data, a convolutional layer unit 352 and a pooling layer unit 353 that extract features in visualization data, and a classification layer unit 354 that classifies visualization data into abnormality types of a motor. In one embodiment, the abnormality type may include a normal state and a plurality of preset abnormal states.

Referring to FIG. 7, the rule-based abnormality diagnostic module 34 and the deep learning-based abnormality diagnostic module 35 use the result data of the audible band analysis module 32 and the non-audible band analysis module 33 to diagnose whether a motor is abnormal.

The abnormality diagnostic model used in the deep learning-based abnormality diagnostic module 35 finds and learns features used to determine abnormality diagnosis by itself, and thus the accuracy of abnormality detection is high. However, since only the abnormality is output, the cause of the abnormality cannot be identified only by the abnormality diagnostic model used in the deep learning-based abnormality diagnostic module 35.

On the other hand, the abnormality diagnostic model used in the rule-based abnormality diagnostic module 34 is provided by matching the abnormality type (H1, H2 . . . ) and the characteristics (E1, E2, E3 . . . ) used in the abnormality determination, and thus can identify the cause together with the type of abnormality of a motor.

The data analysis part 30 and the abnormality diagnostic model generation device 4 may each include control units 36 and 44 for calculating data and memories 37 and 45 (or database) for storing data.

The control units 36 and 44 may be, hardware-wise, implemented by using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors, and an electrical unit for performing other functions.

In addition, in terms of software, embodiments such as procedures and functions described herein may be implemented as separate software modules. Each of the software modules may perform one or more functions and operations described herein. The software code is a software application written in an appropriate programming language, and the software code may be implemented. The software code may be stored in a memory and executed by a control unit.

The memories 37 and 45 may include at least one type of storage medium among a flash memory type, a hard disk type, a multimedia card micro type, a card type memory (for example, SD or XD memory), RAM (random access memory), SRAM (static random access memory), ROM (read-only memory), EEPROM (electrically erasable programmable read-only memory), PROM (programmable read-only memory), magnetic memory, magnetic disk, and optical disk.

In addition, in one embodiment not illustrated, the data analysis part 30 does not include the rule-based abnormality diagnostic module 34 and the deep learning-based abnormality diagnostic module 35, and the abnormality diagnostic model generation device may directly perform abnormality diagnosis of a motor using result data. In this case, the result data of the audible band analysis module 32 and the non-audible band analysis module 33 are transmitted to the abnormality diagnostic model generation device 4 and are analyzed by a rule-based diagnostic model generation part 42 and a Deep learning-based diagnostic model generation part 43.

2. Description of a Motor Noise Detecting Method (Si) Using an AE Sensor According to an Embodiment of the Present Disclosure Referring to FIG. 8, a motor noise detecting method (51) according to an embodiment of the present disclosure includes sensing an analog signal through an AE sensor and an RPM sensor (S10), changing the analog signal sensed through the data acquisition part into a digital signal (S20), and analyzing the digital signal to detect whether an object to be tested is abnormal (S30).

(1) Description of the Sensing of an Analog Signal Through an AE Sensor 11 and an RPM Sensor 12 (S10)

The motor noise detecting device 1 senses an acoustic signal including an elastic wave generated in an object to be tested through an AE sensor 11 and senses the number of revolutions per unit time (RPM) of an object to be tested through an RPM sensor 12.

The sensed acoustic signal and RPM are changed into an analog type electrical signal in the AE sensor 11 and RPM sensor 12.

The analog signals sensed by the AE sensor 11 and the RPM sensor 12 are primarily amplified by the preamplifier 13.

The amplified analog signal is transmitted to the data acquisition part 20.

(2) Description of the Changing of an Analog Signal Sensed Through the Data Acquisition Part into a Digital Signal (S20)

The analog signal amplified by the preamplifier 13 is secondarily amplified through the differential amplifier 22, and the amplified analog signal is converted into a digital signal through the analog-to-digital converter 23.

The converted digital signal is transmitted to the data analysis part 30.

(3) Description of the Analyzing of a Digital Signal to Detect Whether an Object to be Tested is Abnormal (S30)

When a digital signal is received, the audible band analysis module 32 and the non-audible band analysis module 33 analyze the received digital signal to generate result data.

The audible band analysis module 32 analyzes the acoustic signal and the RPM signal included in the preset audible band among the acoustic signals through order analysis to generate result data.

The non-audible band analysis module 33 generates result data including at least one of an integral amount, a width, a maximum height, and a peak counter by envelope extracting the acoustic signal included in the preset non-audible band among the acoustic signals based on time and amplitude.

In addition, the non-audible band analysis module 33 generates result data including at least one of amount of electricity and energy for each frequency band by analyzing the acoustic signal included in the preset non-audible band among the acoustic signals through a fast Fourier transform based on a frequency and an amplitude.

When the result data is generated, the rule-based abnormality diagnostic module 34 and the deep learning-based abnormality diagnostic module 35 analyze the result data to detect whether an object to be tested is abnormal.

The rule-based abnormality diagnostic module 34 performs detection based on a pre-learned rule-based abnormality diagnostic model.

The rule-based abnormality diagnostic model is learned using result data, and is generated by learning a probability corresponding to an abnormality type of the object to be tested when each of the preset cause characteristics is included in the result data. In one embodiment, the rule-based abnormality diagnostic model is generated based on Bayes' theorem.

The deep learning-based abnormality diagnostic module 35 converts the result data into image-type visualization data, and then analyzes the visualization data using a pre-learned deep learning-based abnormality diagnostic model to detect whether an object to be tested is abnormal.

The steps of the method or the algorithm described in relation to the embodiments of the present disclosure may be directly implemented by hardware, a software module executed by the hardware, or a combination thereof. The software module may reside in Random Access Memory (RAM), Read-Only Memory (ROM), Erasable Programmable ROM (EPROM), Electrically Erasable Programmable ROM (EEPROM), flash memory, a hard disk, a removable disk, Compact Disk ROM (CD-ROM) or any type of computer-readable storage medium that is well-known in the technical field to which the present disclosure pertains.

Although the embodiments of the present invention have been described with reference to the attached drawings, those skilled in the technical field to which the present disclosure pertains will understand that the present invention may be practiced in other detailed forms without departing from the technical spirit or essential features of the present disclosure. Therefore, it should be understood that the above-described embodiments are exemplary in all aspects rather than being restrictive.

DESCRIPTION OF SYMBOLS

1: Motor noise detecting device
10: signal sensing part
11: AE sensor
111: Piezoelectric transducer
12: RPM sensor
13: Pre-amplifier
20: Data acquisition part
21: Input connector
22: Differential amplifier
23: Analog-to-digital converter
24: Memory
25: USB connection module
26: Processor
30: Data analysis part
31: Data transmission/reception module
32: Audible band analysis module
321: Filtering unit
322: Order analysis unit
33: Non-audible band analysis module
331: Filtering unit
332: Time domain analysis unit
333: Frequency domain analysis unit
34: Rule-based abnormality diagnostic model
35: Deep learning-based abnormality diagnostic model 351: Data visualization unit
352: Convolutional layer unit
353: Pooling layer unit
354: Classification layer unit
36: Control unit
37: Memory
4: Abnormality diagnostic model generation device
41: Data transmission/reception module
42: Rule-based diagnostic model generation part
43: Deep learning-based diagnostic model generation part
431: Data visualization unit
432: Convolutional layer unit
433: Pooling layer unit
434: Classification layer unit
44: Control unit
45: Memory

What is claimed is:

1. A motor noise detecting device using an AE (Acoustic Emission) sensor, comprising:
a signal sensing part for sensing an acoustic signal generated from an object to be tested;
a data acquisition part for receiving the acoustic signal sensed by the signal sensing part and converting it into an acoustic digital signal; and
a data analysis part for receiving and analyzing the acoustic digital signal to perform a detection on whether the object to be tested is abnormal,
wherein the signal sensing part comprises the AE sensor for sensing an elastic wave included in the acoustic signal,
wherein the data analysis part generates result data of analyzing the acoustic digital signal, analyzes the generated result data through a pre-learned model, and detects whether the object to be tested is abnormal, and
wherein:
the pre-learned model comprises a rule-based abnormality diagnostic model and a deep learning-based abnormality diagnostic model; and
the data analysis part comprises:
a rule-based abnormality diagnostic module for analyzing the result data using the rule-based abnormality diagnostic model, matching an abnormality type of the object to be tested and a cause characteristic included in the result data, and outputting the matched result; and
a deep learning-based abnormality diagnostic module for analyzing the result data using the deep learning-based abnormality diagnostic model and outputting an abnormality type of the object to be tested.

2. The motor noise detecting device of claim 1, wherein the data analysis part further comprises:
an audible band analysis module for generating result data by analyzing a signal included in a preset audible band among the acoustic digital signals; and
a non-audible band analysis module for generating result data by analyzing a signal included in a preset non-audible band among the acoustic digital signals.

3. The motor noise detecting device of claim 2, wherein:
the signal sensing part further comprises a revolution per minute (RPM) sensor configured to sense an RPM signal;
the data acquisition part receives the RPM signal and converts it into an RPM digital signal; and
the audible band analysis module analyzes the signal included in the preset audible band among the acoustic digital signals and the RPM digital signal through order analysis to generate result data.

4. The motor noise detecting device of claim 2, wherein the non-audible band analysis module comprises:
a filtering unit for filtering the signal included in the preset non-audible band among the acoustic digital signals;
a time domain analysis unit for generating result data including at least one of an integral amount, a width, a maximum height, and a peak counter by extracting an envelope based on time and amplitude of a filtered signal; and
a frequency domain analysis unit for generating result data including at least one of amount of electricity and energy for each frequency band by analyzing the filtered signal through a fast Fourier transform based on a frequency and an amplitude.

5. The motor noise detecting device of claim 1, wherein the rule-based abnormality diagnostic model is learned using the result data, and is generated by learning a probability corresponding to an abnormality type of the object to be tested when each of the preset cause characteristics is included in the result data.

6. The motor noise detecting device of claim 5, wherein the rule-based abnormality diagnostic model is generated based on Bayes' theorem.

7. The motor noise detecting device of claim 1, wherein the deep learning-based abnormality diagnostic model is generated by learning visualization data converted from the result data into an image form using a Convolution Neutral Network (CNN).

8. The motor noise detecting device of claim 7, wherein the deep learning-based abnormality diagnostic module converts the result data into visualization data, analyzes the converted visualization data through the deep learning-based abnormality diagnostic model, and outputs an abnormality type of the object to be tested.

9. A motor noise detecting method performed by a device using an AE (Acoustic Emission) sensor, the method comprising:
sensing an acoustic signal generated from an object to be tested using the AE sensor provided in the device;
converting the sensed acoustic signal into an acoustic digital signal;
generating result data of analyzing the acoustic digital signal; and
analyzing the generated result data through a pre-learned model to detect whether the object to be tested is abnormal,
wherein:
the pre-learned model comprises a rule-based abnormality diagnostic model and a deep learning-based abnormality diagnostic model; and
the detection comprises:
analyzing the result data using the rule-based abnormality diagnostic model, matching an abnormality type of the object to be tested and a cause characteristic included in the result data, and outputting the matched result; and
analyzing the result data using the deep learning-based abnormality diagnostic model, and outputting an abnormality type of the object to be tested.

10. The method of claim 9, wherein the generating of the result data comprises: generating first result data by analyzing a signal included in a preset audible band among the acoustic digital signals; and generating second result data by analyzing a signal included in a preset non-audible band among the acoustic digital signals.

11. The method of claim 10, further comprising: sensing a revolution per minute (RPM) signal of the object to be tested using an RPM sensor provided in the device; and converting the RPM signal into an RPM digital signal.

12. The method of claim 11, wherein the generating of the first result data comprises: filtering the signal included in the preset audible band among the acoustic digital signals; and generating the first result data by analyzing the filtered signal and the RPM digital signal through order analysis.

13. The method of claim 11, wherein the generating of the second result data comprises:
 filtering the signal included in the preset non-audible band among the acoustic digital signals;
 generating second result data including at least one of an integral amount, a width, a maximum height, and a peak counter by extracting an envelope based on time and amplitude of the filtered signal; and
 generating second result data including at least one of amount of electricity and energy for each frequency band by analyzing the filtered signal through a fast Fourier transform based on a frequency and an amplitude.

14. The method of claim 9, wherein the rule-based abnormality diagnostic model is learned using the result data, and is generated by learning a probability corresponding to an abnormality type of the object to be tested when each of the preset cause characteristics is included in the result data.

15. The method of claim 14, wherein the rule-based abnormality diagnostic model is generated based on Bayes' theorem.

16. The method of claim 9, wherein the deep learning-based abnormality diagnostic model is generated by learning visualization data converted from the result data into an image form using a Convolution Neutral Network (CNN).

17. The method of claim 16, wherein the outputting of an abnormality type of the object to be tested comprises:
 converting the result data into visualization data; and
 analyzing the converted visualization data through the deep learning-based abnormality diagnostic model, and outputting an abnormality type of the object to be tested.

18. A motor noise detecting program using an AE (Acoustic Emission) sensor, which is combined with a hardware computer device and stored in a storage medium, wherein the program is configured to:
 sense an acoustic signal generated from an object to be tested using the AE sensor;
 convert the sensed acoustic signal into an acoustic digital signal;
 generate result data of analyzing the acoustic digital signal; and
 analyze the generated result data through a pre-learned model to detect whether the object to be tested is abnormal, and
 wherein:
 the pre-learned model comprises a rule-based abnormality diagnostic model and a deep learning-based abnormality diagnostic model; and
 the detection comprises:
 analyzing the result data using the rule-based abnormality diagnostic model, matching an abnormality type of the object to be tested and a cause characteristic included in the result data, and outputting the matched result; and
 analyzing the result data using the deep learning-based abnormality diagnostic model, and outputting an abnormality type of the object to be tested.

* * * * *